US006980392B2

(12) United States Patent
Pierson

(10) Patent No.: US 6,980,392 B2
(45) Date of Patent: Dec. 27, 2005

(54) SYSTEM AND METHOD FOR CAPTURING CONTAMINANTS WITHIN A DISK DRIVE

(75) Inventor: Mark V. Pierson, Binghamton, NY (US)

(73) Assignee: International Business Machines Corporation, Armonk, NY (US)

(*) Notice: Subject to any disclaimer, the term of this patent is extended or adjusted under 35 U.S.C. 154(b) by 214 days.

(21) Appl. No.: 10/409,748

(22) Filed: Apr. 8, 2003

(65) Prior Publication Data
US 2004/0201917 A1 Oct. 14, 2004

(51) Int. Cl.[7] .............................. G11B 5/54; G11B 33/14
(52) U.S. Cl. ............................... 360/97.02; 360/244.2
(58) Field of Search .......................... 360/97.02, 97.03, 360/97.04, 244.2, 244.3, 244.4, 244.9, 245, 360/245.3, 245.5

(56) References Cited

U.S. PATENT DOCUMENTS

| 5,485,327 | A | 1/1996 | Yanagisawa | 360/97.02 |
| 6,665,150 | B2 * | 12/2003 | Smith | 360/265.7 |
| 6,744,602 | B2 * | 6/2004 | Rao et al. | 360/245.3 |
| 2003/0156352 | A1 * | 8/2003 | Voights et al. | 360/97.02 |
| 2003/0189794 | A1 * | 10/2003 | Kameyama et al. | 360/235.8 |

FOREIGN PATENT DOCUMENTS

| GB | 2 155 353 A | | 9/1985 |
| JP | 62-175989 | | 8/1987 |
| JP | 62-248192 | | 10/1987 |
| JP | 02-173996 | | 7/1990 |
| JP | 04-103091 | | 4/1992 |
| JP | 04-106779 | | 4/1992 |
| JP | 5-234350 A | * | 9/1993 |
| JP | 05-234352 | | 9/1993 |
| JP | 2002-230811 A | * | 8/2002 |

* cited by examiner

Primary Examiner—Jefferson Evans
(74) Attorney, Agent, or Firm—William E. Schiesser; Hoffman, Warnick, and D'Alessandro LLC

(57) ABSTRACT

Under the present invention, a contaminant capturing material is positioned within a disk drive. Specifically, the contaminant capturing material is positioned on a suspension, adjacent a slider that hovers proximate a disk within the disk drive when the disk is in rotation. The contaminant capturing material will prevent contaminants from contacting the disk and thereby causing damage. In addition, a set of porous, open celled filters that are coated with the contaminant capturing material can also be provided. If used, the open celled filters are positioned adjacent the disk within an air stream created by a rotation of the disk.

18 Claims, 3 Drawing Sheets

```
┌─────────────────────────────────┐
│ 102                             │
│ PROVIDING A SUSPENSION          │
│ HAVING A SLIDER FOR             │
│ HOVERING PROXIMATE A DISK       │
│ WITHIN THE DISK DRIVE           │
└─────────────────────────────────┘
              │
              ▼
┌─────────────────────────────────┐
│ 104                             │
│ POSITIONING A CONTAINMENT       │
│ CAPTURING MATERIAL ON THE       │
│ SUSPENSION ADJACENT THE         │
│ SLIDER TO CAPTURE               │
│ CONTAMINANTS WITH THE           │
│ DISK DRIVE                      │
└─────────────────────────────────┘
              │
              ▼
┌─────────────────────────────────┐
│ 106                             │
│ POSITIONING A SET OF OPEN CELLED FILTERS │
│ ADJACENT THE DISK WITHIN AN AIR STREAM   │
│ CREATED BY A ROTATION OF THE DISK, WHEREIN│
│ CELLS WITHIN THE FILTERS ARE COATED WITH │
│ CONTAMINANT CAPTURING MATERIAL           │
└─────────────────────────────────┘
```

SYSTEM AND METHOD FOR CAPTURING CONTAMINANTS WITHIN A DISK DRIVE

BACKGROUND OF THE INVENTION

1. Field of the Invention

The present invention provides a system and method for capturing contaminants within a disk drive. Specifically, the present invention provides strategically positioned contaminant capturing material within a disk drive to capture particles.

2. Background Art

As the use of disk drives such as hard disk drives becomes more prevalent, the need to provide reduced contamination increases. Specifically, particles and other contamination can greatly degrade the performance of the disk drive. In many cases, the contaminants come in contact with the disk itself, often inflicting serious damage. These problems are exasperated by the air stream created by the rotation of the disk. In the case of a hard disk drive, the hard disk therein commonly rotates at 7,000–12,000 RPM. The resulting air stream can cause contaminants to be constantly shuffled within the hard disk drive.

To date, attempts at capturing of contaminants within disk drives have been limited to air filters that entrap particles that become airborne within the disk drive. Unfortunately, this does not resolve the problems associated with contaminants. In both cases, contaminants are not prevented from becoming positioned between the disk and the slider/reader. Specifically, the location of the filters along a periphery of the disk drive chamber will not result in capture of contaminants that flow into the disk region of the disk drive. This is especially the case when the disk is stopped.

In view of the foregoing, there exists a need for a system and method for capturing contaminants within a disk drive. Specifically a need exists for a contaminant capturing material to be positioned along a suspension, adjacent a slider that hovers proximate a disk within the disk drive. A further need exists for a set of porous, open celled filters having the contaminant capturing material positioned adjacent the disk, within an air stream created by a rotation of the disk.

SUMMARY OF THE INVENTION

In general, the present invention provides a contaminant capturing material within a disk drive. Specifically, the contaminant capturing material is positioned on a suspension, adjacent a slider that hovers proximate a disk within the disk drive. The contaminant capturing material will prevent contaminants from contacting the disk and thereby will eliminate damage. In addition, a set of porous, open celled filters that are coated with the contaminant capturing material can also be provided. If used, the open celled filters are positioned adjacent the disk within an air stream created by a rotation of the disk.

According to a first aspect of the present invention, a system for capturing contaminants within a disk drive is provided. The system comprises: (1) a suspension having a slider for hovering proximate a disk within the disk drive; and (2) a contaminant capturing material positioned on the suspension adjacent the slider, wherein the contaminant capturing material captures contaminants within the disk drive.

According to a second aspect of the present invention, a system for capturing contaminants within a disk drive is provided. The system comprises: (1) a suspension having a slider for hovering proximate a disk within the disk drive; (2) a contaminant capturing material positioned on the suspension adjacent the slider; and (3) a set of open celled filters positioned adjacent the disk, wherein cells within the filters are coated with the contaminant capturing material, and wherein the contaminant capturing material captures contaminants within the disk drive.

According to a third aspect of the present invention, a method for capturing contaminants within a disk drive is provided. The method comprises: (1) providing a suspension having a slider for hovering proximate a disk within the disk drive; and (2) positioning a contaminant capturing material on the suspension adjacent the slider to capture contaminants within the disk drive.

Therefore, the present invention provides a system and method for capturing contaminants within a disk drive.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram according to the present invention.

Figure 1:
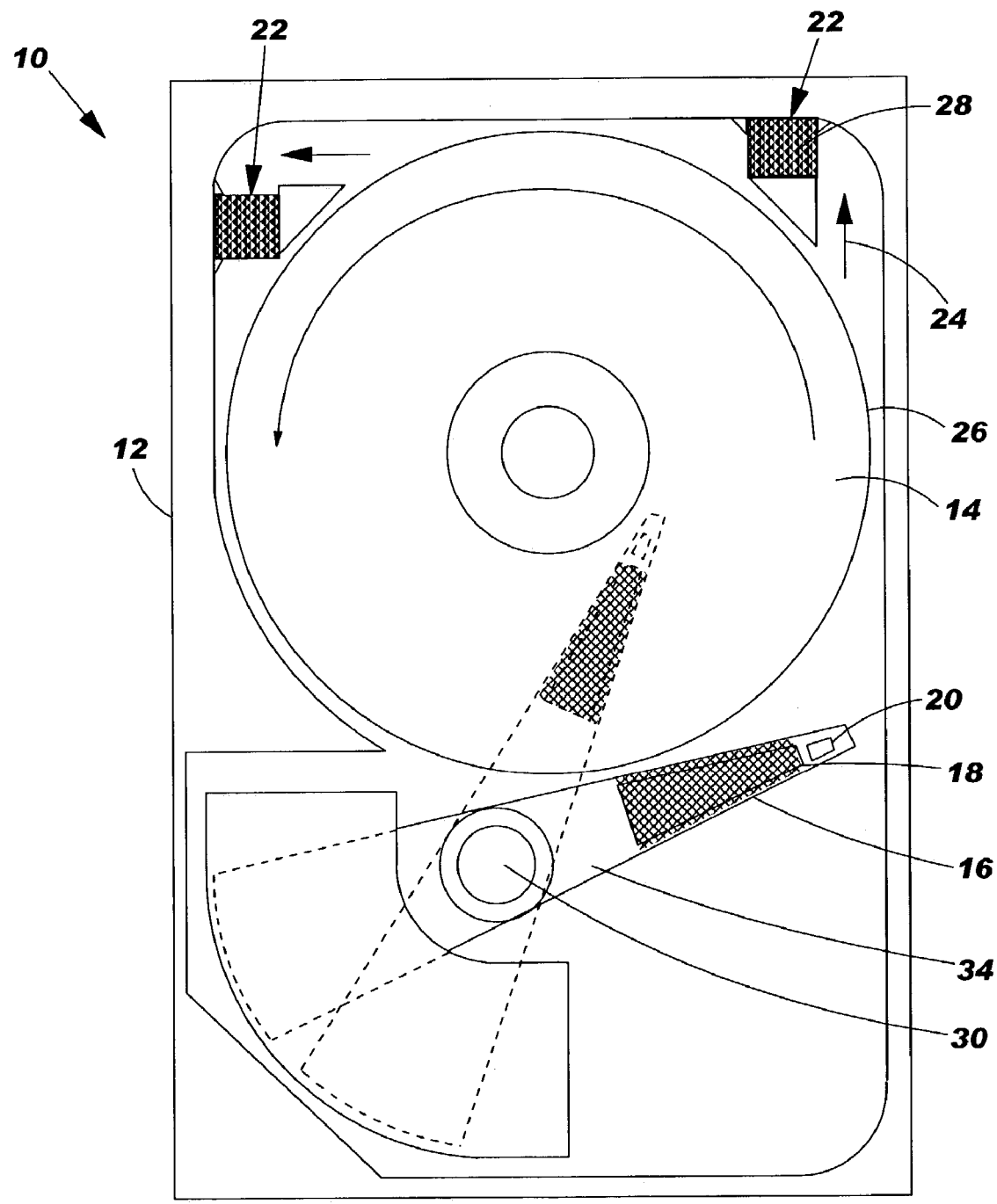
FIG. 1 depicts a system for capturing contaminants within a disk drive, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a contaminant capturing material within a disk drive. Specifically, the contaminant capturing material is positioned on a suspension, adjacent a slider that hovers proximate (above) a disk within the disk drive when the disk is in rotation. The contaminant capturing material will prevent contaminants from contacting the disk and thereby causing damage. In addition, a set of porous, open celled filters that are coated with the contaminant capturing material can also be provided. If used, the open celled filters are positioned adjacent the disk within an air stream created by a rotation of the disk.

Referring now to FIG. 1, an exemplary disk drive 10 is shown. As depicted, disk drive 10 includes base casting 12, disk 14 and suspension 16. Located on a distal end of suspension (along its underside) is slider 20, which hovers proximate (i.e., above) and "reads" and "writes to" disk 14. Typically, slider 20 hovers approximately 29 nanometers (NM) above disk 14 while disk 14 is in rotation. However, it should be understood that slider 20 could hover anywhere from 5–50 NM above disk 14 while disk 14 is in rotation. Suspension 16 is typically mounted on comb 34, which can be rotatably mounted on hub 30 within base casting 12. The mounting of the suspension 16 on hub 30 (via comb 34) allows the suspension 16 to be placed in a parked position or in a position hovering proximate disk 14, as shown in phantom. In a typical embodiment, disk drive 10 is a hard disk drive and disk 14 is a hard disk. However, it should be understood that the teachings described herein could be implemented in conjunction with any type of moving storage.

As indicated above, contaminants such as particles and other airborne elements may inflict great damage to slider 20 and/or disk 14. This is especially the case where the contaminants become "lodged" between slider 20 and disk 14. Under the present invention, suspension 16 is fitted with a contaminant capturing material 18. In general, contaminant capturing material 18 can be any tacky material (e.g., coated, sprayed on, etc.) that will not lose its properties over time such as acrylic adhesive, grease, etc. Moreover, contaminant capturing material 18 is typically applied in a thin coating so as not to affect suspension 16. To this extent, contaminant capturing material 18 could be silicone grease such as Dow Corning 971V. Alternatively, contaminant capturing material 18 could be perfluoro-polyether film such as described in U.S. Pat. No. 5,485,327 herein incorporated by reference. Still yet, contaminant capturing material 18 could be a "rubber-based" adhesive film (e.g., acrylic rubber group, butyl rubber group, or fluoro-rubber group pressure sensitive adhesive). In any event, it should be understood that many different types of contaminant capturing material can be utilized herein, and the present invention is not limited to any certain one.

Figure 2:
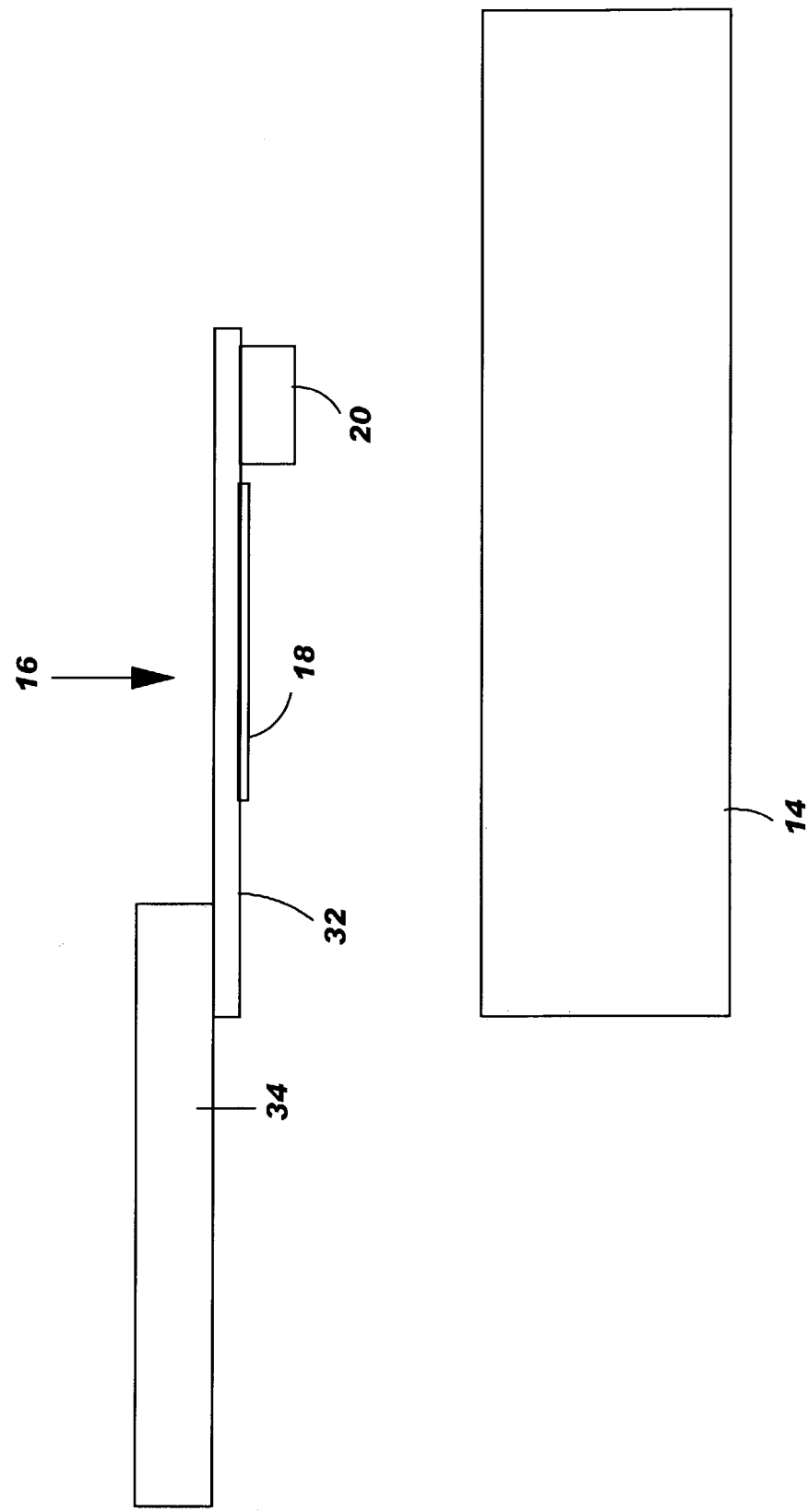
FIG. 2 depicts an isometric view of the suspension of FIG. 1 having a contaminant capturing substance thereon.

In a typical embodiment, contaminant capturing material 18 is positioned along the underside of suspension 16 adjacent slider 20. Specifically, referring to FIG. 2, a side view of comb, 34, suspension 16 and disk 14 is shown. As depicted, contaminant capturing material 18 is positioned along underside 32 of suspension 16. To this extent, contaminant capturing material 18 is typically positioned along a length of the suspension 16 that is adjacent to (i.e., hovers over/above) disk 14. That is, contaminant capturing material 18 is adjacent to slider 20. Such positioning allows contaminant capturing material 18 to capture contaminants along the disk 14 as it rotates. Moreover, such positioning prevents contaminants from becoming lodged between slider 20 and disk 14. Previous systems for capturing contaminants failed to protect disk 14. When contaminants become lodged in the space between slider 20 and disk 14, the resulting contact and friction can inflict great damage to both slider 20 and disk 14. This is especially the case when disk 14 is in rotation.

Referring back to FIG. 1, in addition to the positioning contaminant capturing material 18 along suspension 16, the present invention can also include a set of porous, open celled filters 22. In this case, the pores of filters 22 are coated (but not completely covered) with contaminant capturing material 18. The pores must be left at least partially uncovered so that air can flow in and through filters 22. Moreover, the inner surfaces of cells 28 of filters 22 will be coated with contaminant capturing material 18 so that contaminants can pass into and be captured within the open cells in filters 22. In general, filters 22 are positioned adjacent disk 14 within an air stream 24 created by the rotation of disk 14. For example, if disk 14 rotates counter clockwise, air stream 24 will be created in the direction of the arrows shown. The force created by air stream 24 will force any contaminants not already captured by contaminant capturing material 18 on suspension 16 into filters 22, where they will be captured. It should be appreciated that two filters 22 are shown as an illustrative embodiment only, and that many variations could be implemented. Specifically, the present invention can be implemented with any quantity of filters 22 within air stream 24. Is should also be understood that the contaminant capturing material in filters 22 need not be the same as the contaminant capturing material on suspension 18. Rather, two different materials could be used.

Referring now to FIG. 3, a method flow diagram according to the present invention is shown. As depicted, first step 102 in method 100 is to provide a suspension having a slider for hovering proximate a disk within the disk drive. Second step 104 is to position a contaminant capturing material on the suspension adjacent the slider to capture contaminants within the disk drive. Third step 106 is to position a set of open celled filters adjacent the disk within an air stream created by a rotation of the disk, wherein cells within the filters are coated with contaminant capturing material (which may or not be the same as the contaminant capturing material on the suspension).

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A system for capturing contaminants within a disk drive, comprising:
    a suspension having a slider for hovering proximate a disk within the disk drive;
    a contaminant capturing material positioned on the suspension adjacent the slider, wherein the contaminant capturing material captures contaminants within the disk drive; and
    a set of open celled filters, wherein cells within the filters are coated with the contamainant capturing material.

2. The system of claim 1, wherein the contaminants are particles.

3. The system of claim 1, wherein the disk drive is a hard disk drive, and wherein the disk is a hard disk.

4. The system of claim 1, wherein the set of open celled filters are positioned adjacent the disk within an air stream created by a rotation of the disk.

5. The system of claim 1, wherein the set of open celled filters are porous.

6. The system of claim 1, wherein the set of open celled filters comprises a plurality of open celled filters.

7. The system of claim 1, wherein the set of open celled filters comprises a single open celled filter.

8. A system for capturing contaminants within a disk drive, comprising:
    a suspension having a slider for hovering proximate a disk within the disk drive;
    a contaminant capturing material positioned on the suspension adjacent the slider; and
    a set of open celled filters positioned adjacent the disk, wherein cells within the filters are coated with the contaminant capturing material, and wherein the contaminant capturing material captures contaminants within the disk drive.

9. The system of claim 8, wherein the contaminants are particles.

10. The system of claim 8, wherein the disk drive is a hard disk drive, and wherein the disk is a hard disk.

11. The system of claim 8, wherein the set of open celled filters are porous.

12. The system of claim 8, wherein the set of open celled filters are positioned adjacent the disk in an air stream created by a rotation of the disk.

13. A method for capturing contaminants within a disk drive, comprising:
    providing a suspension having a slider for hovering proximate a disk within the disk drive;
    positioning a contaminant capturing material on the suspension adjacent the slider to capture contaminants within the disk drive; and
    positioning a set of open celled filters adjacent the disk within an air stream created by a rotation of the disk, wherein cells within the filters are coated with the contaminant capturing material.

14. The method of claim 13 wherein the contaminants are particles.

15. The method of claim 13, wherein the disk drive is a hard disk drive, and wherein the disk is a hard disk.

16. The method of claim 13, wherein die set of open celled filters are porous.

17. The method of claim 13, wherein the set of open celled filters comprises a plurality of open celled filters.

18. The method of claim 13, wherein the set of open celled filters comprises a single opened celled filter.

* * * * *